(12) United States Patent
Botte

(10) Patent No.: US 8,562,929 B2
(45) Date of Patent: *Oct. 22, 2013

(54) SELECTIVE CATALYTIC REDUCTION VIA ELECTROLYSIS OF UREA

(75) Inventor: Gerardine G. Botte, Athens, OH (US)

(73) Assignee: Ohio University, Athens, OH (US)

(*) Notice: Subject to any disclaimer, the term of this patent is extended or adjusted under 35 U.S.C. 154(b) by 154 days.

This patent is subject to a terminal disclaimer.

(21) Appl. No.: 13/215,867

(22) Filed: Aug. 23, 2011

(65) Prior Publication Data

US 2011/0302909 A1    Dec. 15, 2011

Related U.S. Application Data

(63) Continuation-in-part of application No. 13/077,277, filed on Mar. 31, 2011, now Pat. No. 8,388,920.

(60) Provisional application No. 61/376,108, filed on Aug. 23, 2010, provisional application No. 61/320,447, filed on Apr. 2, 2010.

(51) Int. Cl.

| | |
|---|---|
| B01D 53/56 | (2006.01) |
| B01D 53/74 | (2006.01) |
| B01D 53/94 | (2006.01) |
| C01B 3/22 | (2006.01) |
| C25B 1/00 | (2006.01) |
| C25B 1/02 | (2006.01) |
| C01C 1/00 | (2006.01) |
| F01N 3/10 | (2006.01) |

(52) U.S. Cl.
USPC ..... 423/235; 423/239.1; 423/358; 423/648.1; 423/215.5; 422/148; 422/168; 422/177; 422/187; 205/464; 205/552; 205/637; 60/275; 60/299; 60/301

(58) Field of Classification Search
USPC ............... 423/235, 239.1, 358, 648.1, 215.5; 422/148, 168, 177, 187; 205/464, 552, 205/637; 60/275, 299, 301
See application file for complete search history.

(56) References Cited

U.S. PATENT DOCUMENTS

| | | |
|---|---|---|
| 3,878,564 A | 4/1975 | Yao et al. |
| 4,045,314 A | 8/1977 | Rod et al. |

(Continued)

FOREIGN PATENT DOCUMENTS

| | | |
|---|---|---|
| EP | 1355721 B1 | 10/2003 |
| JP | 63012348 A | 1/1988 |

(Continued)

OTHER PUBLICATIONS

Urbas, J. and Boyle, J., Commercial Hybrid SNCR/SCR Demonstration, presented at the Advanced Coal-Based Power and Environmental Systems Conference, Pittsburgh, Pennsylvania, 1997.

(Continued)

*Primary Examiner* — Timothy Vanoy

(74) *Attorney, Agent, or Firm* — Wood, Heron & Evans, LLP

(57) ABSTRACT

A method for producing ammonia suitable for use as a reductant in a combustion exhaust gas treatment system is provided that includes the electrolytic hydrolysis of urea under mild conditions. The ammonia generator, which includes an electrolysis apparatus including an electrolytic flow cell, an alkaline electrolyte composition, and a recirculation system, may be operatively coupled to an exhaust gas treatment system to provide an apparatus for reducing nitrogen oxides ($NO_x$) and/or particulate in exhaust gases.

20 Claims, 6 Drawing Sheets

(56) References Cited

U.S. PATENT DOCUMENTS

| | | |
|---|---|---|
| 4,220,635 A | 9/1980 | Schell |
| 4,388,163 A | 6/1983 | Richter et al. |
| 4,394,239 A | 7/1983 | Kitzelmann et al. |
| 5,240,688 A | 8/1993 | von Harpe et al. |
| 5,252,308 A | 10/1993 | Young |
| 5,281,403 A | 1/1994 | Jones |
| 5,399,325 A | 3/1995 | von Harpe et al. |
| 5,543,123 A | 8/1996 | Hofmann et al. |
| 5,641,890 A | 6/1997 | Wesley et al. |
| 5,942,099 A * | 8/1999 | Nitschke et al. ............ 205/617 |
| 5,985,244 A | 11/1999 | Unger |
| 6,077,491 A | 6/2000 | Cooper et al. |
| 6,093,380 A | 7/2000 | Lagana et al. |
| 6,146,605 A | 11/2000 | Spokoyny |
| 6,322,762 B1 | 11/2001 | Cooper et al. |
| 6,436,359 B1 | 8/2002 | Spencer, III et al. |
| 6,506,350 B2 | 1/2003 | Cooper et al. |
| 6,730,280 B2 | 5/2004 | Cooper et al. |
| 6,896,789 B2 | 5/2005 | Ross |
| 7,220,395 B2 | 5/2007 | Cooper et al. |
| 8,388,920 B2 * | 3/2013 | Botte ............................ 423/235 |
| 2003/0085135 A1* | 5/2003 | Andrews et al. ............. 205/637 |
| 2004/0057887 A1 | 3/2004 | Sun et al. |
| 2005/0167286 A1* | 8/2005 | Awano et al. ................ 205/765 |
| 2005/0211569 A1 | 9/2005 | Botte et al. |
| 2005/0247050 A1 | 11/2005 | Kaboord et al. |
| 2008/0314755 A1 | 12/2008 | Botte |
| 2008/0318097 A1 | 12/2008 | Botte |
| 2009/0050489 A1 | 2/2009 | Botte |
| 2009/0081500 A1 | 3/2009 | Botte |
| 2009/0095636 A1 | 4/2009 | Botte |
| 2009/0127094 A1 | 5/2009 | Botte |
| 2009/0145750 A1 | 6/2009 | Botte |
| 2010/0032320 A1 | 2/2010 | Botte et al. |
| 2010/0247420 A1 | 9/2010 | Botte |
| 2010/0252422 A1 | 10/2010 | Botte |

FOREIGN PATENT DOCUMENTS

| | | |
|---|---|---|
| JP | 2191528 A | 7/1990 |
| JP | 11-171535 A | 6/1999 |
| WO | 2011123620 A1 | 10/2011 |

OTHER PUBLICATIONS

Allied Environmental Technologies, Inc., Ammonia Conditioning of Flue Gases, 21 pp.

Mandel, S. B. And Zuendt, R., "Efficient Operation of SCR/SNCR," summary from Proceedings of the 2006 Environmental Controls Conference, 2 pp., 2006.

Processes for SCR Ammonia Production from Urea, Letter Report for the U.S. Dept. of Energy, Office of Fossil Energy, Jan. 2002, 35pp.

European Patent Office, International Search Report for PCT/US2011/048809, mailed Nov. 28, 2011, 11pp.

European Patent Office, International Search Report for PCT/US2011/030694, mailed Jul. 7, 2011, 11pp.

U.S. Patent Office, Official Action for U.S. Appl. No. 12/250,864, mailed Oct. 21, 2011, 6 pp.

Di Giulio, Simmona, et al. Fate of Organic Nitrogen during Electrooxidation over Conductive Metal Oxide Anodes, Ind. Eng. Chem. Res., 2007, pp. 6783-6787, vol. 46.

Jara, Carlos Carlesi, et al., Combined direct and indirect electroxidation of urea containing water, J. Appl. Electrochem., 2008, pp. 915-922, vol. 38.

Osetrova, N. V., et al., Products of Anodic Oxidation of Carbamide: Effect of Anionic Composition of Solution, Russian Journal of Electrochemistry, 2002, pp. 266-269, vol. 38.

* cited by examiner

SELECTIVE CATALYTIC REDUCTION VIA ELECTROLYSIS OF UREA

CROSS-REFERENCE TO RELATED APPLICATIONS

Pursuant to 37 C.F.R. §1.78, this application claims the benefit of and priority to prior filed Provisional Patent Application Ser. No. 61/376,108, filed Aug. 23, 2010, and is a continuation-in-part of application Ser. No. 13/077,277, filed Mar. 31, 2011, which issued as U.S. Pat. No. 8,388,920 on Mar. 5, 2013, which is related to Provisional Patent Application Ser. No. 61/320,447, filed on Apr. 2, 2010, each of which is expressly incorporated herein by reference in their entirety.

FIELD OF INVENTION

The present invention relates to methods and devices for treating exhaust gases.

BACKGROUND

There is concern over the environmental impact of emissions from fossil fuel combustion sources. For example, the exhaust gas of vehicles powered with diesel fuel contains chemical pollutants such as nitrogen oxides ("NOx") and sulfur oxides ("SOx"), as well as particulates. Selective catalytic reduction (SCR) and selective non-catalytic reduction (SNCR) are means for converting nitrogen oxides ($NO_x$) into diatomic nitrogen, $N_2$, and water, $H_2O$. In SCR, a catalyst is used in combination with a gaseous reductant, which is added to a stream of flue or exhaust gas and is absorbed onto the catalyst. In SCNR, the reductant is injected into the flue gas in a furnace within an appropriate temperature window. Additionally, flue gas conditioning with a gaseous reductant can also enhance electrostatic precipitator performance for removing fly ash. In SCR, SNCR, and fly ash removal systems, the reductant is typically ammonia or urea.

The $NO_x$ reduction reaction takes place as the gases pass through the catalyst chamber. Before entering the catalyst chamber the ammonia, or other reductant, such as urea, is injected and mixed with the gases. The chemical equations for using either anhydrous or aqueous ammonia for a selective catalytic reduction process are:

$$4NO+4NH_3+O_2 \rightarrow 4N_2+6H_2O \quad \text{(Equation 1)}$$

$$2NO_2+4NH_3+O_2 \rightarrow 3N_2+6H_2O \quad \text{(Equation 2)}$$

$$NO+NO_2+2NH_3 \rightarrow 2N_2+3H_2O \quad \text{(Equation 3)}$$

The reaction for urea as a reductant instead of ammonia is:

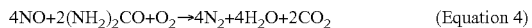

$$4NO+2(NH_2)_2CO+O_2 \rightarrow 4N_2+4H_2O+2CO_2 \quad \text{(Equation 4)}$$

Compared to urea, ammonia is more reactive, is more easily dispersed uniformly into the flue gas stream, and is active over a broader temperature range, as well as being more efficient. Urea, as such, while also an effective reductant, forms unwanted byproducts, such as carbon monoxide (CO) and nitrous oxide ($N_2O$), both of which are now under critical scrutiny by environmental authorities.

Commonly urea is thermally hydrolyzed to form ammonia for exhaust gas treatment applications. The hydrolysis of urea to form ammonia can be broken down into two distinct reactions. The first reaction is a mildly exothermic reaction, wherein heat is given off as urea hydrolyzes to form ammonium carbamate. The second reaction, in which the ammonium carbamate is converted to ammonia and carbon dioxide, is strongly endothermic, which overall dominates the thermodynamics of the conversion of urea to ammonia and carbon dioxide, i.e., the overall reaction is endothermic. Therefore, the hydrolysis of urea requires a substantial amount of heat and quickly stops when the supply of heat is withdrawn. For example, the liberation of ammonia commences at around 110° C. and becomes rapid at around 150° C. to 160° C., with or without catalytic assistance.

$$H_2O+(NH_2)_2CO \rightarrow (NH_2)CO_2^-NH_4^+ + NH_3 + \text{heat} \quad \text{(Equation 5)}$$

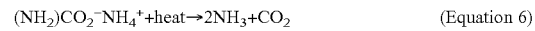

$$(NH_2)CO_2^-NH_4^+ + \text{heat} \rightarrow 2NH_3+CO_2 \quad \text{(Equation 6)}$$

Excess water promotes the hydrolysis reaction, the overall reaction for which is as follows:

$$(x+1)H_2O+(NH_2)_2CO+\text{heat} \rightarrow 2NH_3+CO_2+(x)H_2O \quad \text{(Equation 7)}$$

However, under the reaction conditions necessary to affect useful throughput, the water quality is important. For example, in a conventional thermal hydrolysis of urea to ammonia for an SCR system, an aqueous solution of urea is atomized through a spray nozzle into a heated vaporization chamber. As such, the excess water is also vaporized during the hydrolysis of urea to ammonia, thereby leaving behind any non-volatile substances such as minerals. Minerals and other non-volatile substances can adhere to equipment surfaces, such as spray nozzles and the vaporization chamber walls, and build up over time, which may lead to blockage of the spray nozzle or reduced heat transfer efficiency to the vaporization chamber. Thus, the water used in thermal hydrolysis systems needs to be demineralized. Further, the thermal hydrolysis of urea method is also sensitive to the quality of the urea. For example, formaldehyde present in urea can negatively affect the performance of an SCR system in a way similar to that of using demineralized water.

In view of the foregoing, the hydrolysis of urea requires an external heat source to initiate the reaction, even when coupled with combustion engines, and also is sensitive to the extent of demineralization of the water, and the quality of urea used in the hydrolysis. Therefore, more efficient and/or safer methods for generating ammonia for exhaust gas treatment applications are needed.

SUMMARY OF THE INVENTION

The present invention is premised on the realization that ammonia can be produced from the electrolysis of urea to supply exhaust gas treatment applications, such as selective catalytic reduction (SCR) systems, selective non-catalytic reduction (SNCR) systems, and/or flue gas conditioning systems.

According to one embodiment of the present invention, a method for supplying $NH_3$ to an exhaust gas treatment system is provided. The method includes supplying urea to an electrolytic flow cell that includes an inlet, an outlet, a cathode having a first conducting component, an anode having a second conducting component, an alkaline electrolyte composition in electrical communication with the anode and the cathode, and a recirculation system operatively coupled to the inlet and the outlet of the electrolytic cell; producing ammonia by the electrolytic hydrolysis of urea by applying a voltage difference to the electrolytic flow cell, wherein the voltage difference is applied across a cathode and an anode, wherein the voltage difference is sufficient to effect the electrolytic hydrolysis of urea to produce at least $NH_3$; recovering at least a portion of the $NH_3$; transferring the at least a portion of the $NH_3$ to the exhaust gas treatment system; and recirculating at least a portion of the alkaline electrolyte composition. The alkaline electrolyte composition has a hydroxide concentration of at least 0.01 M or a pH of at least 8, and the recirculation system contains at least a portion of the alkaline electrolyte composition.

According to another embodiment of the invention, an exhaust gas treatment system for a combustion engine is provided. The exhaust gas treatment system includes at least one of a selective catalytic reduction system, a selective non-catalytic reduction system, or a flue gas conditioning system; and an ammonia generator. The ammonia generator includes an electrolytic flow cell having an inlet, at least one outlet, a cathode having a first conducting component, an anode having a second conducting component, an alkaline electrolyte composition in electrical communication with the anode and the cathode, where the alkaline electrolyte composition has a hydroxide concentration of at least 0.01 M or a pH of at least 8, and a recirculation system operatively coupled to the inlet and the at least one outlet of the electrolytic cell. The at least one outlet from the ammonia generator is further in communication with the at least one of the selective catalytic reduction system, the selective non-catalytic reduction system, or the flue gas conditioning system.

The invention will be further appreciated in light of the following detailed description and drawings in which:

BRIEF DESCRIPTION OF THE DRAWINGS

The accompanying drawings, which are incorporated in and constitute a part of this specification, illustrate embodiments of the invention and, together with the general description of the invention given above, and the detailed description given below, serve to describe the invention.

DETAILED DESCRIPTION

The treatment of combustion exhaust gas is facilitated by the electrolysis-induced hydrolysis of urea and is described herein. Advantageously, the electrolytic cell conditions may be modified to additionally generate hydrogen, which may be injected to increase fuel efficiency, to provide heat into the electrolytic cell, or to provide electricity into the electrolytic cell.

Figure 1:
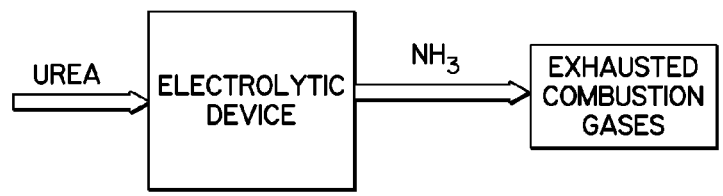
FIG. 1 is a schematic representation of a method to produce ammonia from urea.

Referring now to FIG. 1, urea may be subjected to electrolysis-induced hydrolysis in an electrolytic device. The electrolytic device may comprise a cell or multiple cells that each contains an anode and a cathode. The electrolytic cell can operate in batch mode, continuous mode, semi-continuous, and with recirculation, as needed to provide on demand and controlled injection of ammonia into a process gas stream such as a combustion gas exhaust. At the anode, the working electrode of the cell, urea is hydrolyzed to ammonia. The overall hydrolysis reaction is provided in Equation 8 below.

$$(NH_2)_2CO + H_2O \rightarrow NH_3\uparrow + CO_2\uparrow \qquad \text{(Equation 8)}$$

Figure 2:
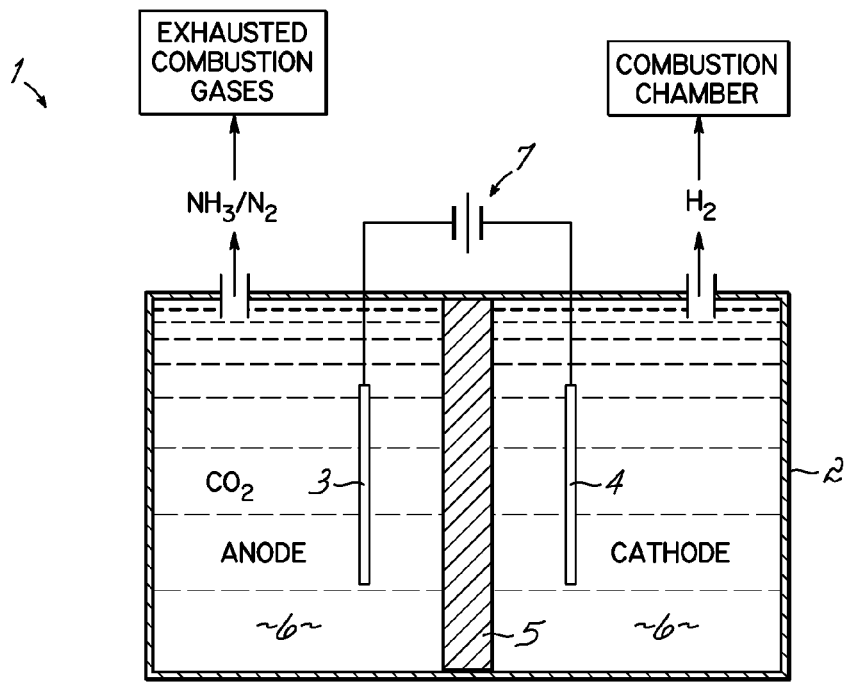
FIG. 2 is a diagrammatical view of a simplified electrolytic cell coupled to exhausted combustion gases.

Referring more particularly to FIG. 2, a simplified electrolytic cell 1 representing a single batch-type arrangement comprises a tank 2, which may be made of light gauge iron, steel, TEFLON®, or other material not attacked by an alkaline electrolyte composition. An electrode assembly comprising two electrodes, an anode 3 and a cathode 4, is suspended within an alkaline electrolyte composition 6 contained in tank 2. Optionally, a separator 5 may be positioned between the anode and cathode. In this single batch-type arrangement, the alkaline electrolyte composition 6 includes an effective amount of urea as described below. The anode 3 and cathode 4 are electrically connected to a voltage source 7, which provides the electrical energy for the electrolysis of urea contained in the alkaline electrolyte composition 6. In a batch-type arrangement, the alkaline electrolyte composition may be stirred to facilitate mass transfer. It will be readily apparent to one of ordinary skill in the art that the above cell is readily adaptable to a continuous flow cell configuration, semi-continuous, and with recirculation of the alkaline electrolyte composition, as discussed in detail below.

The electrodes comprise a conductor or a support which can be coated with one or more active conducting components. Exemplary conductors include, but are not limited to, metals such as nickel and platinum, alloys such as carbon steel or stainless steel, or other materials capable of conducting electricity such as carbon or graphite. Exemplary electrode support materials may be chosen from many known supports, such as foils, meshes, sponges, and beads, for example. The support materials may include, but are not limited to, Ni foils, Ti foils, graphite, carbon fibers, carbon paper, glassy carbon, carbon nanofibers, and carbon nanotubes. Aside from these specific support materials listed, other suitable supports will be recognized by those of ordinary skill in the art.

Accordingly, the cathode may comprise a conductor that is inert to an alkaline electrolyte composition. Additionally, the cathode may further include a support material that is inert to the alkaline electrolyte compositions and coated with one or more active conducting components. For example, the conducting component of the cathode may include carbon, cobalt, copper, iridium, iron, nickel, palladium, platinum, rhodium, ruthenium, or mixtures or alloys thereof. Exemplary conducting components include carbon steel and stainless steel.

The anode may comprise a conductor that is inert to the alkaline electrolyte composition. Additionally, the anode may further include a support material that is inert to the alkaline electrolyte compositions and coated with one or more active conducting components. According to embodiments of the present invention, the reaction of urea hydrolysis occurs at the conducting component of the anode. Therefore, the conductor and/or the conducting component at the anode is one or more metals active toward electrolytic hydrolysis of urea. Active metals may include cobalt, copper, iridium, iron, platinum, nickel, rhodium, ruthenium, or mixtures or alloys thereof, for example, and in particular, nickel. The active metals may be in an oxidized form, such as nickel oxyhydroxide.

The structure of the anode is not limited to any specific shape or form. For example, the active metal may be formed as foil, wire, gauze, bead, or coated onto a support.

Exemplary working electrodes include, nickel electrode-posited on a carbon support, such as carbon fibers, carbon paper, glassy carbon, carbon nanofibers, or carbon nanotubes, and nickel formed into beads and suspended in a nickel gauze.

One electrode found to be favorable to the electrolysis-induced hydrolysis of urea is an activated nickel oxyhydroxide modified nickel electrode (NOMN) on different 4 cm$^2$-metallic substrates (Ni foil, Ni gauze, Ti foil and Ti gauze) that have been electroplated with 10±0.1 mg of Ni using a Watts bath. Specifically, the plated nickel electrode is activated by immersed in a solution containing nickel sulfate, sodium acetate, and sodium hydroxide at 33° C. Stainless steel is used as counter electrode. The plated nickel electrode may be used as the anode and cathode by manual polarity switching at 6.25 A/m$^2$ for four 1-minute cycles and two 2-minute cycles. Finally, the electrode is kept as the anode at the same current and maintained thereat for two hours. The activated electrode yields higher current densities than those of M/Ni, where M represents a metallic substrate.

The separator 5 compartmentalizes the anode and cathode. Separators should be constructed from materials chemically resistant to the alkaline electrolyte composition. Many polymers are suitable for constructing separators, such as Teflon® and polypropylene. Separators are not required for simple batch-type arrangements, but may be advantageous for continuous flow electrochemical cells or fuel cells. Separators may include ion exchange membranes, solid electrolytes or electrolytic gels, for example. Separators may be permeable, semi-permeable or impermeable to gases or liquids.

According to the present invention, the electrolyte composition is alkaline and has a hydroxide ion concentration of at least 0.01 M or a pH of at least 8. According to one example, the alkaline electrolyte composition has a hydroxide concentration of at least 0.01 M and a pH of at least 8. As such, the alkaline electrolyte composition may include a sufficient quantity of any suitable hydroxide salt, carbonate salt or bicarbonate salt to provide an electrolyte composition with a hydroxide ion concentration of at least 0.01M and/or a pH of at least 8. An alkali metal hydroxide or alkaline earth metal hydroxide salt, such as lithium hydroxide, rubidium hydroxide, cesium hydroxide, barium hydroxide, strontium hydroxide, potassium hydroxide, sodium hydroxide, magnesium hydroxide, calcium hydroxide, and mixtures thereof may be used. In particular, the alkaline electrolyte composition includes potassium hydroxide. Advantageously, the sequestration of $CO_2$ gas, shown in Equation 1, may be realized by the reaction of $CO_2$ with hydroxide to form carbonate, which may be retained in the alkaline electrolyte composition. Similarly, alkali metal carbonates or bicarbonate salts or alkaline earth metal carbonates or bicarbonate salts are also suitable electrolytes.

The concentration of the hydroxide, carbonate, or bicarbonate salts may vary according to embodiments of the invention. For example, according to one embodiment, the concentration of the hydroxide, carbonate, or bicarbonate salts may be from about 0.01 M to about 8 M. In another example, the concentrations of potassium hydroxide, potassium carbonate, potassium bicarbonate, sodium hydroxide, sodium carbonate, or sodium bicarbonate from about 2 M to about 8 M and from about 4 M to about 8 M, are particularly effective.

The alkaline electrolyte composition may comprise a gel, such as a solid polymer electrolyte. Suitable gels include, but are not limited to, those containing polyacrylic acid, polyacrylates, polymethacrylates, polyacrylamides and similar polymers and copolymers.

The electrolytic gel may be prepared using any suitable method. One method includes forming a polymer and then injecting a hydroxide, a carbonate or a bicarbonate salt electrolyte into the polymer to form a polymeric mixture. In another method, the monomer may be polymerized in the presence of a hydroxide, a carbonate, or bicarbonate salt electrolyte.

According to one embodiment, the electrodes are separated by the electrolyte gel which contains an effective hydroxide, carbonate, or bicarbonate ion concentration. The anode is contacted with a urea solution as the feed stock. The cathode is then contacted with a suitable aqueous solution, such as water or a hydroxide, carbonate, or bicarbonate solution, for example.

Alternatively, the gel electrolyte is not fixed and can flow through an electrolytic cell. According to another embodiment, urea may be contained within the gel or an aqueous solution comprising urea may flow within the gel electrolyte.

In the cell shown in FIG. 2, the electrolyte composition 6 includes urea, which may vary from trace amounts up to about a saturated solution, which is approximately 12 M at standard temperature and pressure. Advantageously, the specific source and purity of the urea is not particularly limited.

Moreover, for the formation of aqueous solutions of urea, the specific source and purity of the water used in making the aqueous solution is not particularly limited or critical. One reason for this advantage is that, according to embodiments of the present invention, the entire aqueous solution comprising urea is not volatilized to thereby leave behind trace minerals and other non-volatile materials. Instead, the majority of the water remains in the liquid form, which substantially maintains the trace minerals in solution. Additionally, after the electrolytic hydrolysis of at least a portion of the urea within the electrolytic cell, the aqueous solution or the alkaline electrolyte composition being discharged from the electrochemical cell may be recirculated.

Voltage source 7 may be any available source, such as batteries, fuel cells, power from the grid, and renewable energy sources, such as a solar cell or a wind-turbine generator, for example. When the electrolytic cell is coupled with an SCR system on a motor vehicle, the electric source may be from an alternator. In order to attain desired efficiencies, a voltage sufficient to initiate the electrolytic hydrolysis of urea is required. But it is preferable that the voltage not be so high as to significantly electrolyze water. Generally, the minimum voltage required to electrolyze or electrolytically-hydrolyze urea is about 0.85 volts. The voltage required to electrolyze water is greater than 1.7 volts with a platinum electrode at standard conditions, but the rate of electrolysis and/or electrolysis-induced hydrolysis depends on other factors, such as temperature and ionic strength/conductivity. Based on the foregoing, the voltage range applied to the electrolytic cell to electrolytically-hydrolyze urea may be from about 0.85 volts to less than about 1.7 volts. The voltage range may be from about 1.2 volts to about 1.6 volts. Typically, the electrolytic cell will be operated at a constant voltage within these ranges.

Additionally, the rate of producing ammonia and/or hydrogen from urea may be controlled by varying the voltage within different regions of the electrolytic cell. For example, in a packed-bed type electrolytic cell, the voltage within the packed-bed of an anodic catalyst material can be adjusted along the catalyst bed to control the rate of ammonia production and/or injection into an SCR or SNCR device. As such, different regions in the catalyst bed may have different potentials to control the rate of ammonia production. For example, a packed bed column configuration may include a plurality of anodes with each being electrically insulated from the other anodes and capable of having voltage controlled separately thereto, such as that represented in FIG. 6. For a given maximum production of ammonia, the totality of the anodes may be polarized. However, when a lower amount of ammonia is desired, then less than all of the anodes are polarized.

Amperage or current density may affect the performance of an electrolytic cell, as well. Pure water has poor electrical conductivity and, as such, electrolysis in pure water is very slow and essentially occurs due to the self-ionization of water. Generally, the rate of electrolysis increases by adding an electrolyte, such as a salt, an acid or a base. Therefore, the presence of an added hydroxide ion, a carbonate ion or a bicarbonate ion and its respective counter ion in the alkaline electrolyte composition enhances the conduction of electrical current. The current density of the electrolytic cell described herein ranges from about 1 mA/cm$^2$ to about 500 mA/cm$^2$. In some embodiments, the current density range may be from about 50 mA/cm$^2$ to about 400 mA/cm$^2$. The current density range may be from about 200 mA/cm$^2$ to about 300 mA/cm$^2$. Overall, it is only necessary to provide a sufficient amount of current to induce the active form of the active metal, which comprises the anode, to cause the hydrolysis of urea. Typically, the electrolytic cell will be operated at a constant current or current density within these ranges.

The electrical current may also be used to control the production of ammonia from the electrolytic hydrolysis of urea and therefore control the rate of injecting ammonia into an exhaust gas treatment system. For example, a given electrical current may be required to induce the active form of the active metal in all the regions of the anode to maximize the production of ammonia. The applied current may be lowered when the need for ammonia decreases.

Electrolytic cells may operate over varying ranges of pressure and temperature. The operating pressure may be about atmospheric pressure or ambient pressure with no upper pressure limit other than the physical limits of the reaction vessel. If desired, the operating pressure of the electrolytic cell may be varied to control the rate of ammonia that is injected into an exhaust gas. The operating temperature range may be from about 0° C. to about 100° C. An acceptable operating temperature range may be from about 40° C. to about 80° C. More specifically, an operating temperature range from about 60° C. to about 70° C. is particularly useful.

The temperature in the electrolytic cell may be controlled with any available source. For example, the electrolytic cell may further include a heater apparatus operatively coupled to electrolytic cell, and/or a recirculation system operatively coupled to the electrolytic cell, wherein the recirculation system contains at least a portion of the alkaline electrolyte composition. Exemplary heating apparatus include heating jackets that surround the electrolytic cell, from which heat may be supplied by external sources, such as steam, heated water, or other heated fluids. Other possible heating sources can include, but are not limited to, electric heaters or combustion gases. Alternatively, or in addition, the recirculation system may also include a heating apparatus for increasing the temperature of the alkaline electrolyte composition at a point external to the electrolytic cell. The desired heating source may depend on the availability and/or compatibility with the system. For example, electric heat may be the most convenient way to provide the heat to achieve a desired operating temperature for the use of the electrolytic cell in an automobile SCR system, especially during cold start and during extreme weather conditions. Accordingly, the electrolytic cell may have temperature control that is independent of the temperature of the engine.

Figure 6:
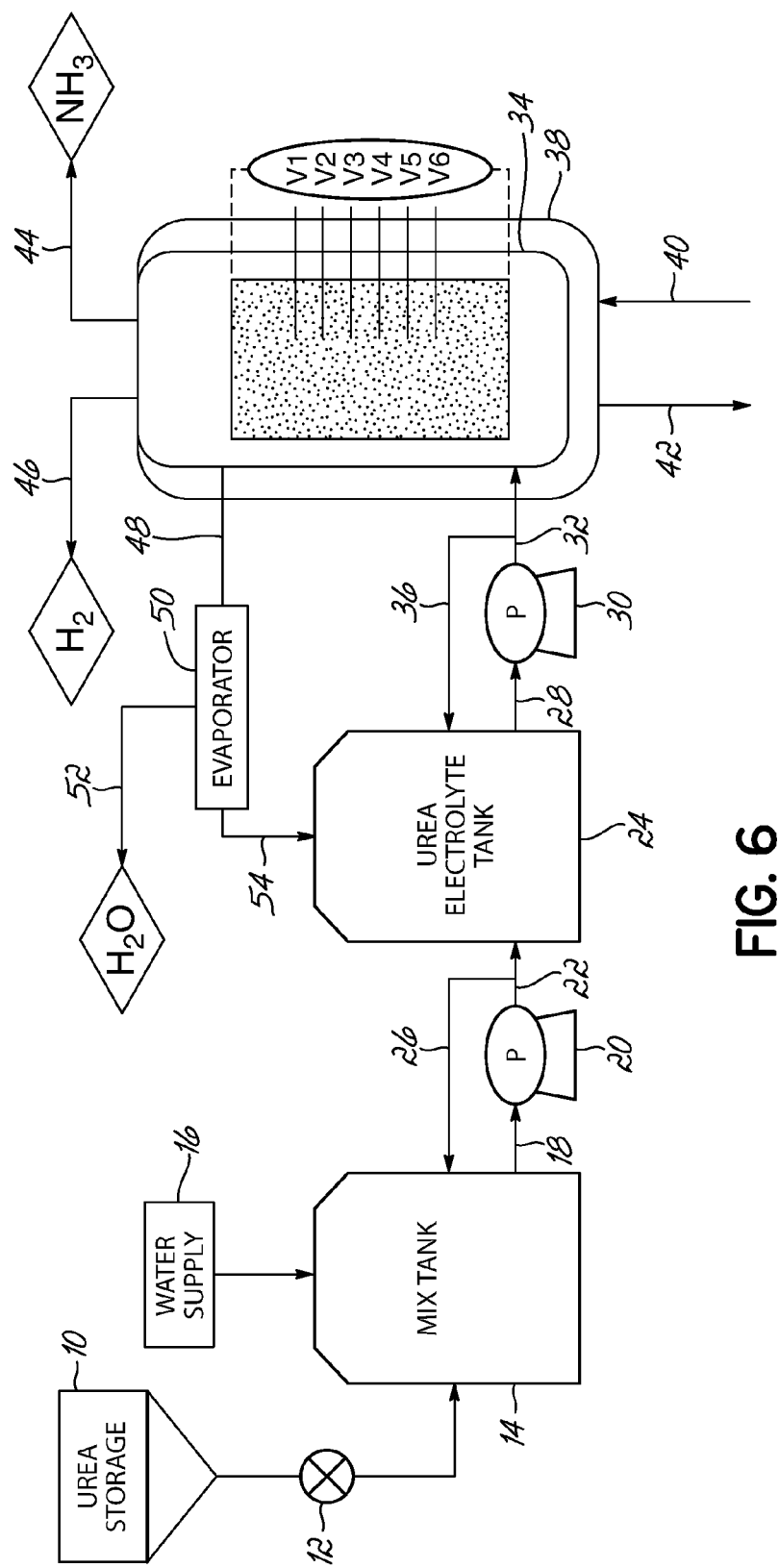
FIG. 6 is a diagrammatic depiction of an electrolytic ammonia generator system according to an embodiment of the present invention.

It will be readily apparent to one of ordinary skill in the art that the above-described electrolytic cell is readily adaptable to a continuous flow cell configuration, semi-continuous, and with recirculation of the alkaline electrolyte composition. For example, an exemplary system for the continuous generation of sufficient quantities of ammonia to adequately supply the needs of a coal fired power plant on a continuous basis is shown in FIG. 6. From a urea storage container 10, urea pill is supplied via a rotary feed valve 12 to a mix tank 14 where the urea prill is mixed with water from a water supply 16 to form a urea solution. The mix tank 14 includes a discharge line 18, which supplies the urea solution to a urea solution feed pump 20 to transfer the urea solution to a urea electrolyte tank 24 through the urea electrolyte tank inlet 22. A urea solution recirculation line 26 permits continuous operation of the urea solution feed pump 20. According to this embodiment, the urea electrolyte composition is formed by mixing the urea solution from the mix tank 14 with an alkaline electrolyte composition including hydroxide, carbonate, or bicarbonate salts of alkali metals or alkaline earth metal, or combinations thereof. The urea electrolyte tank 24 includes a discharge line 28, which supplies the urea electrolyte solution to a urea electrolyte solution feed pump 30 to transfer the urea electrolyte solution through an electrolytic cell inlet 32 to an electrolytic cell 34. A urea electrolyte solution recirculation line 36 permits continuous operation of the urea electrolyte solution feed pump 30, and may also participate in control of the volume or level of urea electrolyte solution within the electrolytic cell 34. The electrolytic cell 34 includes a heating jacket 38 having an inlet line 40 and an outlet line 42 for recirculating heating fluids therethrough.

One typical flow cell design is that of a packed-bed type of electrolytic flow cell, which enables the voltage and/or the current within the packed bed of anodic catalyst material to be varied along the catalyst bed and thereby control the rate of ammonia evolution. A packed-bed type flow cell is depicted in FIG. 6 with V1-V6 representing the variable voltage capability of the electrolytic cell 34, where the insulating materials between the electrically insulated regions of the packed anodic catalyst bed are not shown. This configuration is also adaptable for controlling the amount of urea being hydrolyzed based on the level or volume of urea electrolyte solution covering the catalyst bed. In other words, varying an area percentage of a total area of the anodic catalyst bed in contact with a urea solution will vary the rate of ammonia production. As such, increasing the amount of urea electrolyte solution covering the available catalyst bed will increase the rate of ammonia production.

During operation, the urea electrolyte solution flows through the electrolytic cell 34 and thereby contacting the electrodes. Accordingly, the generated ammonia from the electrolytic hydrolysis of urea is supplied to an exhaust gas treatment system through an ammonia discharge line 44. Depending on the electrolytic cell operating conditions, hydrogen may also be produced and supplied to auxiliary systems through a hydrogen gas discharge line 46. The urea electrolyte solution, after having been depleted of at least a portion of its urea, is returned to the urea electrolyte tank 24 though urea electrolyte return line 48.

According to one aspect of this embodiment, the alkaline electrolyte composition is concentrated to a desired level prior to being returned to the urea electrolyte tank 24. In one example, the urea electrolyte return line 48 delivers the discharge of the electrolytic cell 34 to an evaporator 50 wherein excess water is removed via a water discharge line 52 to achieve a desired concentration. Advantageously, any non-hydrolyzed urea is principally retained in solution and is therefore also concentrated therein. The concentrated electrolyte solution is then transferred to the urea electrolyte tank 24 through a concentrated electrolyte discharge line 54. The rate of excess water removal can be controlled by modifying various parameters, such as temperature and pressure. Accordingly, the operating temperature of the evaporator 50 may range from about 120° C. to about 90° C., depending on the relative operating pressure of the evaporator. For example, the evaporator 50 may be operated at about 110° C. and near or below atmospheric pressure. The source of heat for the evaporator 50 is not particularly constrained to any source.

Figure 7:
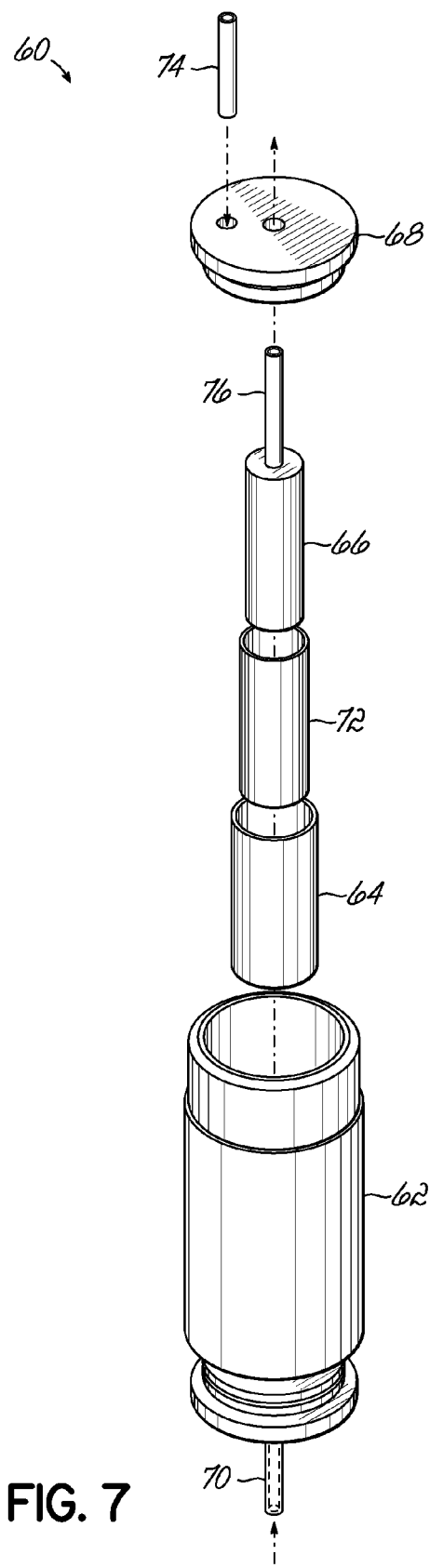
FIG. 7 is exploded view of an electrolytic flow cell according to an embodiment of the present invention.

Other flow cell designs are also amenable to the instant embodiment. As shown in FIG. 7, a flow cell 60 may include a jacketed containment vessel 62 having a tubular cathode 64, a tubular anode 66 and a vessel lid 68. The jacketed containment vessel 62 may be thermally controlled by any suitable method. The jacketed vessel 62 further includes inlet 70. When present, a tubular separator 72 compartmentalizes the tubular cathode 64 and the tubular anode 66, which permits separation of the effluents therefrom. Accordingly, each electrode chamber may have its own discharge port, whereby the vessel lid 68 is configured to accommodate a cathode connector tubing 74 and an anode connector tubing 76. For example, the cathode connector tubing 74 may be hollow and include a conductor to thereby provide both a discharge flow path from the proximity of the tubular cathode 64 and an electrical connection. Similarly, the anode connector tubing 76 may be hollow and include a conductor to thereby provide both a discharge flow path from the proximity of the tubular anode 66 and an electrical connection.

Figure 8:
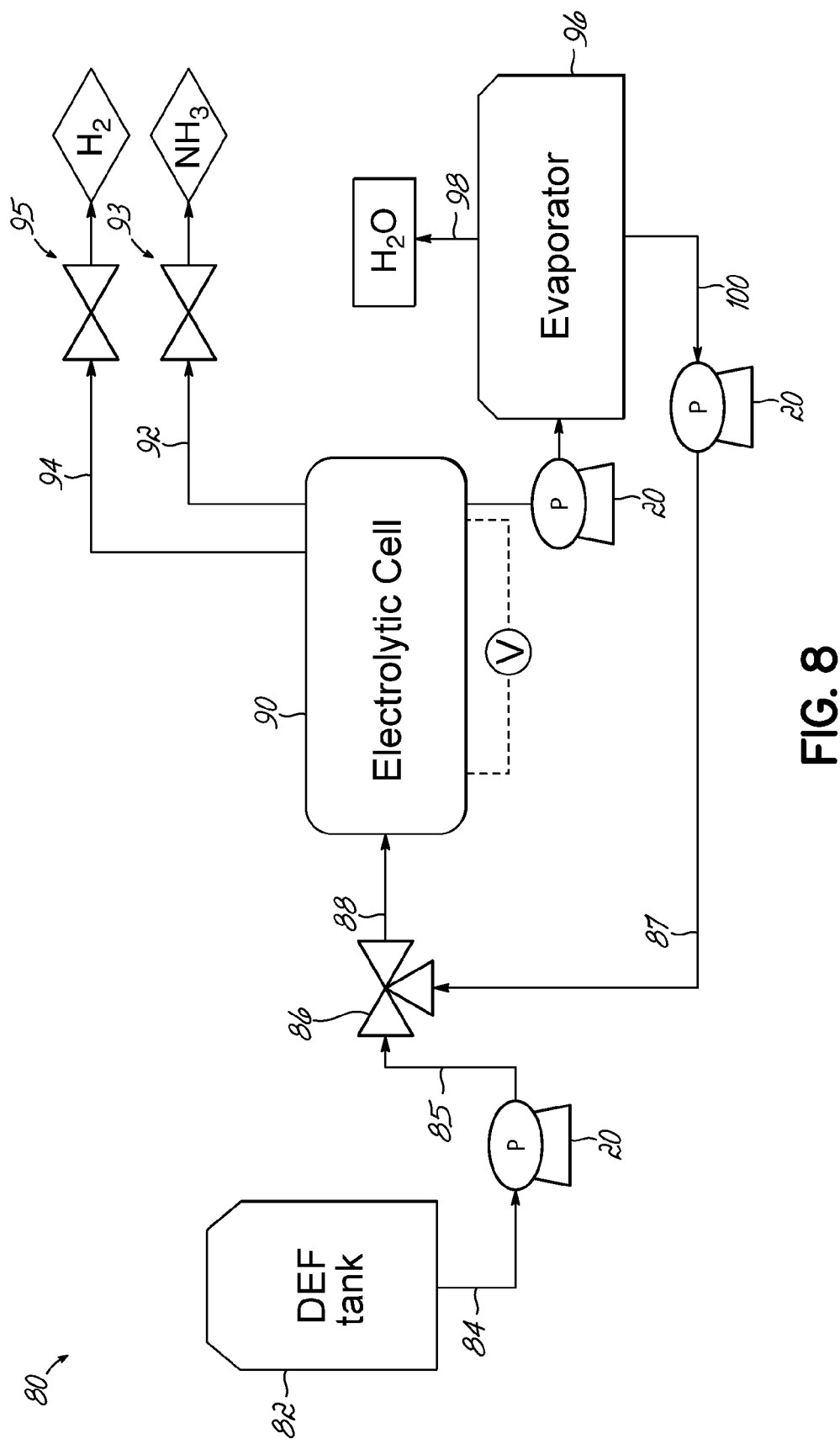
FIG. 8 is a diagrammatic depiction of an electrolytic ammonia generator system according to another embodiment of the present invention.

According to another embodiment shown in FIG. 8, as an alternative to supplying urea from prill, which needs to be dissolved prior to electrolysis-induced hydrolysis of the urea, the urea may be supplied to the electrolytic flow cell 90 as a pre-dissolved, concentrated aqueous solution. Many conventional SCR systems use to treat diesel exhaust utilize diesel exhaust fluid (DEF), which can be, for example, about 32 wt % urea dissolved in deionized water. The exhaust gas treatment systems in accord with the principles of the present invention can include an ammonia generator 80, which further includes a DEF tank 82. Pump 20, via inlet line 84 and discharge line 85, transfers the DEF from the DEF tank 82 to a three way feed valve 86, which mixes the DEF and alkaline electrolyte composition in the desired portions to achieve a target urea concentration therein. If the DEF tank 82 is kept pressurized, for example, about 20 psig, a pump 20 will not be needed for the system. This may allow a more compact system for transportation applications. Advantageously, the alkaline electrolyte composition is supplied via recirculating alkaline electrolyte composition supply line 87. The urea electrolyte solution is transferred through an electrolytic cell inlet 88 to the electrolytic cell 90. Accordingly, the generated ammonia from the electrolytic hydrolysis of urea is supplied to an exhaust gas treatment system through an ammonia discharge line 92 through valve 93. Depending on the electrolytic cell operating conditions, hydrogen may also be produced and supplied to auxiliary systems through a hydrogen gas discharge line 94 through valve 95. Further, after electrolysis-induced hydrolysis of at least a portion of the urea, the discharge of the electrolytic cell is directed to an evaporator 96 via pump 20, wherein the alkaline electrolyte composition is concentrated via removal of water via water discharge line 98. The alkaline electrolyte composition may be concentrated near to the saturation point for the given alkaline electrolyte(s), which elevates the freezing point of the solution.

Figure 9:
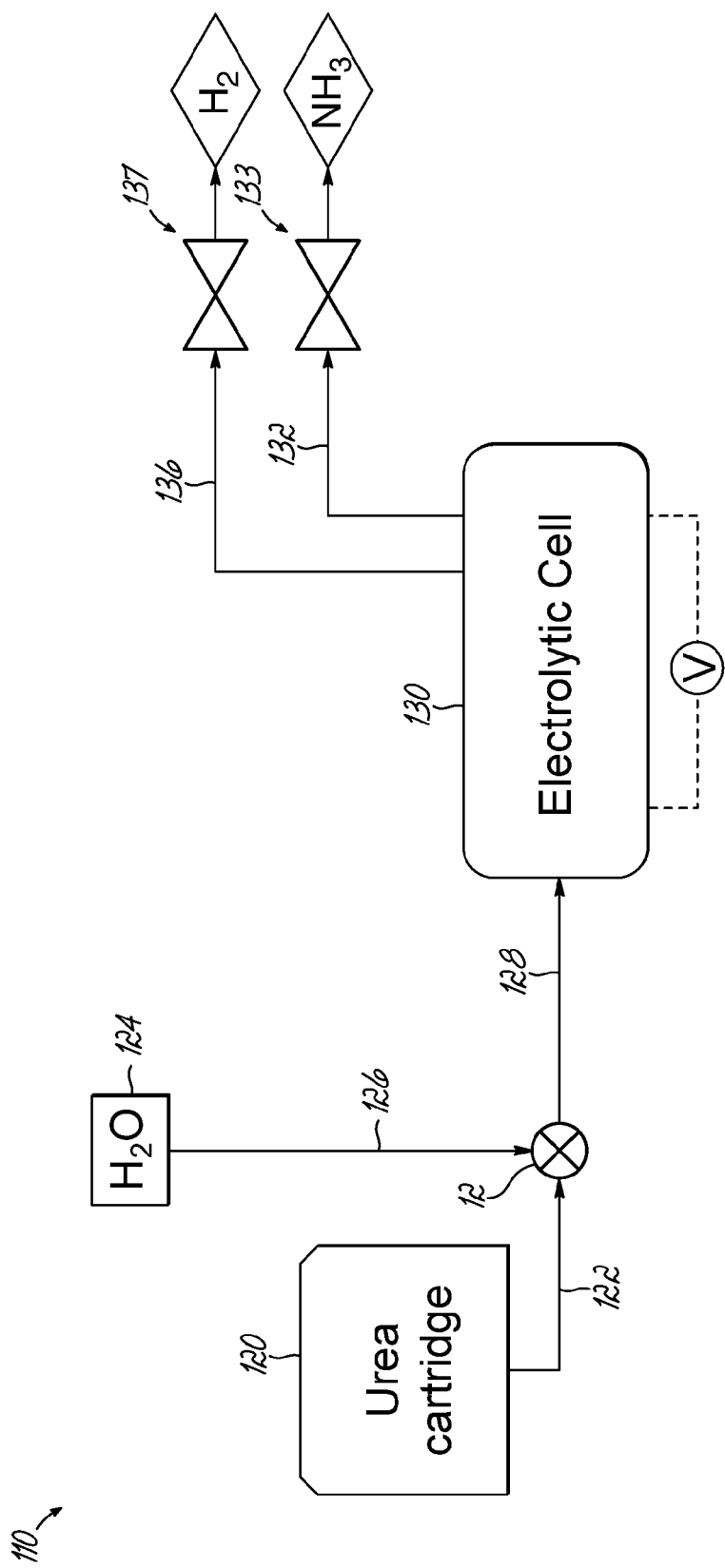
FIG. 9 is a diagrammatic depiction of an electrolytic ammonia generator system according to yet another embodiment of the present invention.

As shown in FIG. 9, in yet another embodiment the ammonia generator 110 may include an electrolytic cell 130 having a supply of solid urea in a urea cartridge 120. The urea may be transferred from the cartridge 120 via supply line 122 and mixed with water in a rotary mixing valve 12 prior to being added to the electrolytic cell 130 via inlet 128. In this embodiment, in the absence of physical losses, water need only be introduced into the system from water supply tank 124 via water supply line 126 over time to make up for the water consumed during the hydrolysis of urea (see Equation 8). For example, the water may be introduced at regularly scheduled time intervals and/or based on one or more operating parameter. The water can be added directly in the electrolytic cell 130 at regularly schedule time intervals to decrease freezing point due its mixture with the electrolyte. The ammonia and/or hydrogen, which can be transported via discharge lines 132, 136 and valves 133, 137, respectively, are utilized for the treatment of exhaust combustion gas as described above. According to another aspect, the urea cartridge 120 may be contained within the electrolytic cell 130. According to another aspect, the electrolyte may be contained within the electrolytic cell and may be stored in gel form. Although not shown, the electrolyte can be recirculated within the electrolytic cell 130 to facilitate improved mixing with the urea cartridge 120.

The present invention will be further appreciated in view of the following examples.

Example 1

Figure 4:
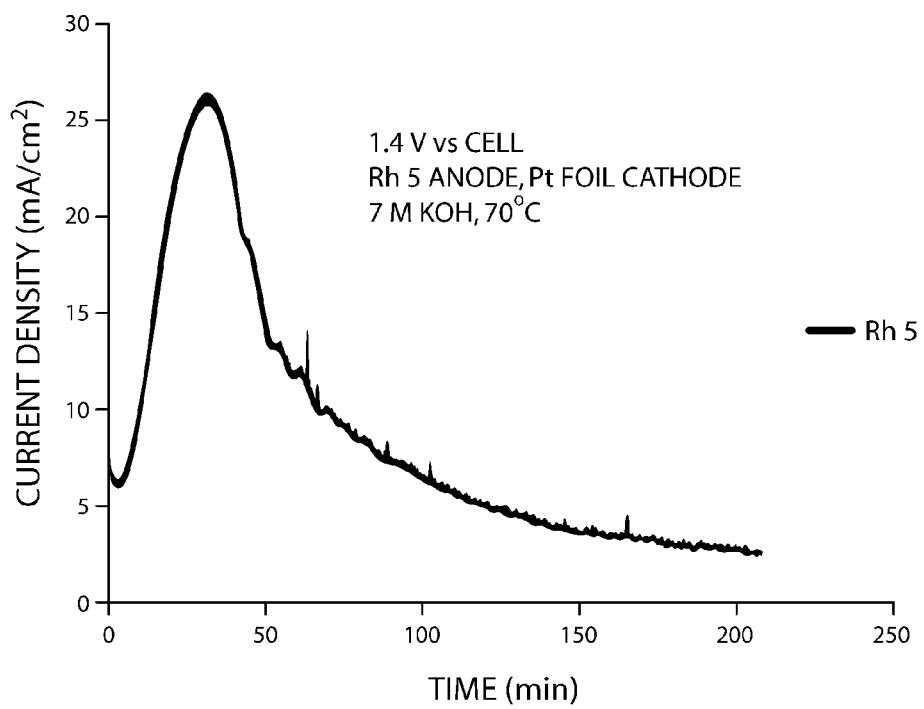
FIG. 4 is a plot of current density at a constant voltage (1.4 V) in the electrochemical cell over time.

Two closed cells (1000 mL) were assembled. Each cell was filled with 200 mL of 7 M KOH and 0.33 M urea solution, and stirred at 120 rpm. Voltage (1.4 V) was applied to cell B (supplied with Arbin Industries MSTAT) using a Rh—Ni anode (0.15 mg/cm$^2$ Rh on Ni foil, 10 cm$^2$) and platinum foil (10 cm$^2$) as the cathode. Samples were taken via liquid sampling ports and analyzed for ammonia concentration periodically by extracting 10 mL and diluting 1:100 with distilled water. A 50 mL aliquot of this analyte was added to a flask, 1 mL of pH adjusting solution was added with stirring, and the solution was analyzed using an ion selective electrode. After two hours of constant voltage operation, Cell A and B contained aqueous ammonia concentrations of 3600 and 4700 ppm, respectively (Table 1). After 3 hours of operation, cell A increased to 3800 ppm while cell B increased to 6450 ppm, which provided that the cell with applied potential had 41% higher conversion of urea to ammonia. Cell B averaged about 25 mA/cm$^2$ during the first two hours, which decreased to near 8 mA/cm$^2$ for the third hour (FIG. 4). These results show that the lower current density was more effective in converting the urea to ammonia.

TABLE 1

Urea hydrolysis via electrolysis samples.

| Test Time (total hrs) | Cell | ppm NH$_3$ (liquid Phase) | Avg. Current (mA) | % increase w/ electrolysis |
|---|---|---|---|---|
| 2 | A | 3637 | 98 | 23 |
|   | B | 4715 |    |    |
| 3 | A | 3800 | 30 | 41 |
|   | B | 6450 |    |    |

Application of 1.4 V to cell B resulted in a 41% higher conversion after 3 hours of operation, indicating that the urea to ammonia reaction is in fact enhanced by electrolysis. Electrolysis at a low voltage contributes to kinetics of the urea to ammonia conversion.

Example 2

Two closed cells (1000 mL) were assembled with Rh—Ni anodes (8 cm$^2$ each; cell A: 0.05 mg/cm$^2$, cell B: 0.15 mg/cm$^2$) and platinum foil cathodes (15 cm$^2$), filled with 7 M KOH and 0.33 M urea, and heated to 70° C. Liquid sampling ports were included for monitoring aqueous ammonia concentration ex-situ by ISE throughout the duration of the experiment. Voltage (1.33 V) was applied to both cells A and B (supplied with Arbin Industries MSTAT) with 120 rpm stirring. A lower voltage was chosen as compared to Example 1 above because it was postulated that a lower voltage, which will provide a lower current density, was needed to affect the NiOOH catalyzed reaction to ammonia.

Figure 5:
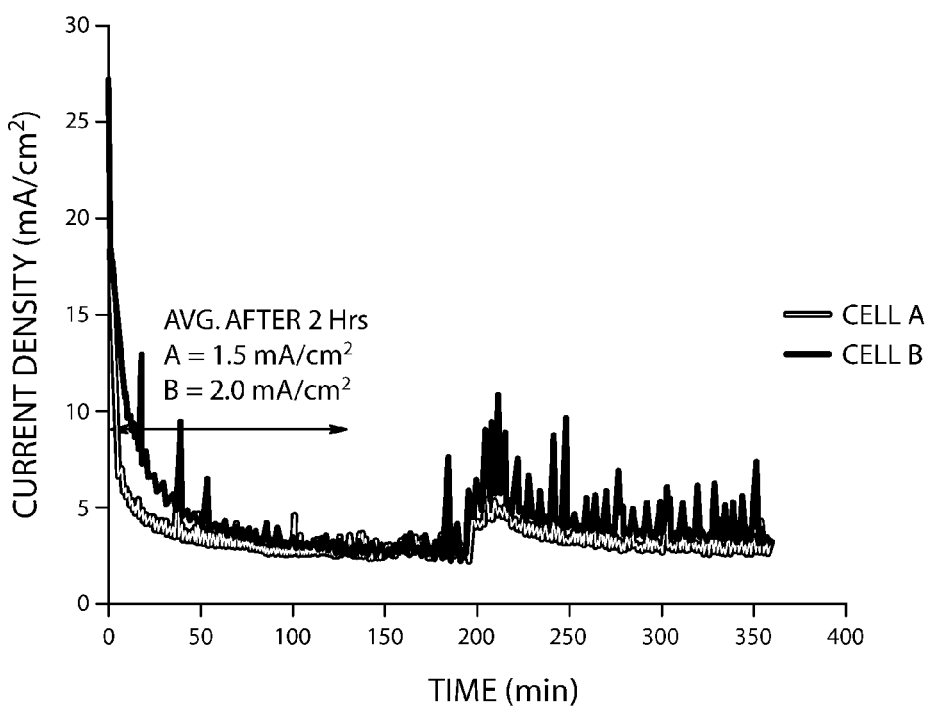
FIG. 5 is a plot of current density at a constant voltage (1.33 V) in the electrochemical cell over time.

Samples were taken and analyzed for ammonia concentration periodically by extracting 10 mL and diluting 1:100 with distilled water. A 50 mL aliquot of this analyte was added to a flask with stirrer and ISE electrode and 1 mL of pH adjusting solution, as described in Experiment 1. After two hours of constant voltage operation, Cell A and B contained aqueous ammonia concentrations of 4890 and 6470 ppm, respectively (Table 2). These concentrations did not increase after the third hour of operation. The average current in each cell for the first two hours was 1.5 and 2.0 mA/cm$^2$ for cell A and B, respectively (FIG. 5). It is postulated that the apparent stoppage in urea conversion to ammonia after the first sample period is likely the result of the current density dropping to around 1 mA/cm$^2$ after 2 hours, which may be below the level necessary to affect the reaction. It was observed that a black precipitate formed on the platinum cathode in both cells. Most of the conversion affected by applied potential probably took place within the first hour where average current was 2-3 mA/cm$^2$. Otherwise, leakage from the liquid sampling ports could explain the lack of increase in conversion.

TABLE 2

Urea hydrolysis via electrolysis samples.

| Time | Cell A ppm NH$_3$ | Cell B ppm NH$_3$ |
|---|---|---|
| 2 hrs | 4890 | 6470 |
| 3 hrs | 4580 | 6400 |

Based on these results, the effect of current density on the conversion of urea to ammonia and the effect of catalyst loading Cell B exhibited a higher conversion than cell A, probably because it had an anode with higher loading of rhodium and operated under a slightly higher average current density. Again, these results show that electrolysis at a low voltage can contribute to favorable kinetics of the urea to ammonia conversion.

For example, for a Diesel truck application, providing 0.5 Kg of ammonia per hour to an SCR unit at a current of 6.25 amps and a cell voltage of 1.33 volts, would correspond to 8.31 watts of power. The thermal energy consumed would be 1,980 kilojoules. Additionally, under these conditions, approximately 0.23 g/hour of hydrogen may be generated, which equates to about 33 kilojoules of thermal energy, and may be injected into the combustion engine of the diesel truck to minimize carbon dioxide emissions and increase fuel efficiency.

In another example, for a 500 MW coal-fired power plant, providing 200 Kg of ammonia per hour to an SCR unit at a current of 2,500 amps and a cell voltage of 1.33 volts, would correspond to 3.325 kilowatts of power. The thermal energy consumed would be 792,000 kilojoules. Additionally, under these conditions, approximately 93.3 g/hour of hydrogen may be generated, which equates to about 13,228 kilojoules of thermal energy.

Example 3

Electrolytic Hydrolysis of Urea: A cell containing 7 M KOH/0.33 M urea solution at atmospheric pressure was subjected to electrolysis-induced hydrolysis. A cell voltage of 1.4 volts was applied to a 2×2.5 cm$^2$ carbon-paper anode deposited with Ni, and a 5×5 cm$^2$ Pt foil cathode. Under these conditions, the presence of ammonia was detected from the conversion of urea into ammonia and carbon dioxide. The hydrolysis pathway becomes favorable with increasing hydroxide salt concentration and increasing temperatures. For example, urea samples contained in 0 M, 1 M, 5 M and 7 M KOH at 50° C. for 89 hours produced 0.7%, 4.2%, 27.4 and 36.7% hydrolysis, respectively. A 7 M KOH sample of urea at 70° C. for 24 hours provided over 95% hydrolysis.

Example 4

Flow Cell Hydrolysis of Urea: In a sandwich-style urea electrolytic cell that compartmentalized the anode and cathode, a polypropylene membrane was used as a separator. The anode was constructed of a 5 cm$^2$ carbon-paper support, on which was electrodeposited Ni. The cathode was constructed of a 5 cm$^2$ carbon paper support, on which was electrodeposited Pt. The electrodes were immersed in 5M KOH/0.33 M urea at 70° C. A cell voltage of 1.33 volts was applied and ammonia evolved from the anode. It was noted that a small amount of hydrogen was produced from the cathode. The respective gases were analyzed using a MG2 SRI 8610C gas chromatograph with a thermal conductivity detector (TCD), Haysep column, and a molecular sieve column. Pure hydrogen was observed at the cathode, while ammonia, N$_2$ and small amounts H$_2$ were observed from the anode in gas phase. The hydrogen on the anode side of the separator is believed to arise from hydrogen passing through the polypropylene membrane. Ammonia was further detected in the liquid phase using an Orion ammonia selective electrode (ISE). No carbon species were detected in gas phase. It is postulated that any CO$_2$ that may have been generated was quickly transformed into potassium carbonate.

Example 5

Electrolysis of Urea: A cell containing 5 M KOH/0.33 M urea solution at 25° C. and atmospheric pressure was subjected to electrolysis. A cell voltage of 1.4 volts was applied to a 2×2.5 cm$^2$ carbon-paper anode deposited with Ni, and a 5×5 cm$^2$ Pt foil cathode. It was determined by gas chromatography that the electrolysis of urea produced nitrogen at the anode of this electrolytic cell, whereas hydrogen was produced at the cathode. Ammonia, which is presumably derived from the electrolysis-induced hydrolysis of urea, was detected in the electrolyzed solution using an Orion ammonia selective electrode (ISE). No carbon species were detected in the gas phase. It is postulated that the generated CO$_2$ was quickly transformed into potassium carbonate by reacting with potassium hydroxide in the alkaline electrolyte composition.

Therefore, at the anode, urea may be oxidized to nitrogen and carbon dioxide. At the cathode, the counter electrode, hydrogen may be produced, as shown in the following reaction:

$$(NH_2)_2CO+H_2O \rightarrow N_2\uparrow+CO_2\uparrow+3H_2\uparrow \text{ (Overall Electrolysis Reaction)}$$

Figure 3:
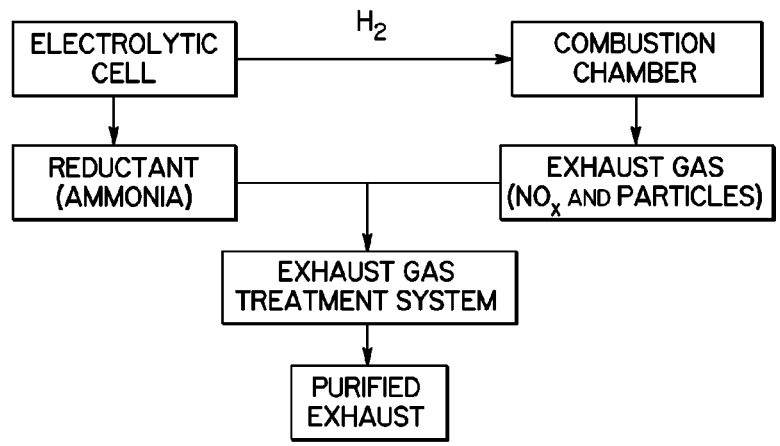
FIG. 3 is a diagrammatical view of a method to purify exhaust gases from a combustion engine.

Therefore, in addition to the electrolysis-induced hydrolysis of urea to supply the requisite ammonia reductant to an exhaust gas treatment system, under the appropriate conditions, the foregoing electrolysis of urea may provide hydrogen, which may be injected into a combustion chamber that is attached to the exhaust gas treatment system, as shown in FIG. 3. Thus, adding hydrogen to the combustion chamber may facilitate improved fuel combustion efficiency, as well as reducing unwanted emission by-products.

Example 6

The model system in accordance with the embodiment represented in FIG. 6 has been designed with an electrolytic cell having a total volume of 825 liter, with 660 liters of an anodic bed providing 1,247 m² of active metal surface. Extrapolating the experimental data obtained from a batch-type configuration, operation mass transfer parameters were calculated for the foregoing system. Additionally, a comparison was made between the inventive electrolytic hydrolysis method (EU2A) and the commonly-used chemical hydrolysis. As shown in Table 4 below, the electrolytic urea to ammonia (EU2A) hydrolysis method provides an ammonia stream which is predominantly (e.g., 64 molar %) comprised of ammonia. The calculated parameters and comparison data are shown in Tables 3 and 4, respectively.

TABLE 3

Calculated operating parameters.

| Stream | Rate (kg/hr) | Composition (%) |
|---|---|---|
| 1: Prill urea | 352.9 | 100.0 |
| 2: Water | 119.4 | 100.0 |
| 3: Concentrated urea | 472.3 | Urea: 74.7 |
| | | $H_2O$: 25.3 |
| 4: Urea electrolyte reactor feed | 1138.0 | Urea: 31.0 |
| | | $K_2CO_3$: 22.5 |
| | | $H_2O$: 46.5 |
| 5: Electrolyte recycle | 665.7 | $K_2CO_3$: 38.4 |
| | | $H_2O$: 61.6 |
| 6: $NH_3$ to SCR (@ 70° C.; 30 psig) | 472.2 | $NH_3$: 42.4 |
| | | $CO_2$: 54.7 |
| | | $H_2O$: 2.9 |
| 7: Hydrogen to fuel cell | 0.1 | 100.0 |
| 8: Saturated steam (150 psig) | 394.8 | 100.0 |
| 9: Exhausted steam (150 psig) | 394.8 | 100.0 |

TABLE 4

Comparison of methods.

| Description | Chemical hydrolysis | EU2A |
|---|---|---|
| Volume of reactor (liters) | 7,250 | 825 |
| SCR Ammonia Reagent | 200 kg/hr | 200 kg/hr |
| Dry Urea Flow Rate | 352 | 352 |
| Reagent Concentration | 50% wt | 40-60% wt |
| DI water | 375 kg/hr | 119 kg/hr |
| Steam heating (150 psig) | 840 kg/hr | 395 kg/hr |
| Power | N/A | 1.8 kW ** |

TABLE 4-continued

Comparison of methods.

| Description | Chemical hydrolysis | EU2A |
|---|---|---|
| Gas Molar Composition | | |
| $NH_3$ (%) | 22.8 | 64.0 |
| $CO_2$ (%) | 11.4 | 32.0 |
| $H_2O$ (%) | 65.8 | 4.0 |

** Reusing the hydrogen in a fuel cell with 50% efficiency.

Example 7

The model system in accordance with the embodiment represented in FIG. 8 was calculated for an electrolytic cell having a volume of 2 liters. A comparison was made between the inventive electrolytic hydrolysis method (EU2A) and the commonly-used DEF-SCR systems used on diesel trucks (which are based on chemical hydrolysis). As shown in Table 5 below, the electrolytic urea to ammonia (EU2A) hydrolysis method provides an ammonia source that is substantially more volume and weight efficient compared to that of DEF-SCR chemical hydrolysis systems.

TABLE 5

Comparison of methods.

| | |
|---|---|
| Service life (miles) | 12,000 |
| Volume of reactor (liters) | 2 |
| Volume electrolyte recovery (liters) | 2 |
| Total volume of system (liters) | 4* |
| Fraction of volume compare to a DEF full tank (30 gal) | 3.5% |
| Weight of reactor (kg) | 10 |
| Weight electrolyte and recovery vessel (kg) | 3 |
| Total system weight (kg) | 13* |
| Fraction of weight compare to a DEF full tank (123 kg) | 10.5% |

*Tubing, valves, and fittings are not included in these calculations.

Example 8

The model system in accordance with the embodiment represented in FIG. 9 was calculated for an electrolytic cell having a volume of 2 liters. A comparison was made between the inventive electrolytic hydrolysis method (EU2A) using solid urea versus the conventional DEF-SCR system. As shown in Table 6 below, the electrolytic urea to ammonia (EU2A) hydrolysis method provides an ammonia source that is substantially more volume efficient that chemical hydrolysis systems.

TABLE 6

Comparison of methods.

| | | |
|---|---|---|
| Service life (miles) | 12,000 | 60,000 |
| Volume of reactor with contained electrolyte (liters) | 2 | 2 |
| Volume of Urea (liters) | 62 | 82 |
| Water consumed (liters) | 25 | 123 |
| Total volume of system (liters) | 87* | 205* |
| Fraction of volume compared to a DEF full tank (30 gal or 113 liters) | 76% | N/A |
| Weight of reactor with contained electrolyte (kg) | 12 | 12 |

TABLE 6-continued

Comparison of methods.

| | | |
|---|---|---|
| Weight urea (kg) | 82 | 410 |
| Weight of water consumed | 25 | 123 |
| Total system weight (kg) | 107* | 533* |
| Fraction of weight compare to a DEF full tank (123 kg) | 87% | N/A |

*Tubing, valves, and fittings are not included in these calculations.

One issue commonly encountered in electrolytic cells, is the slow deactivation of the one or both of the electrodes. In some instances, the deactivation may be attributed to the attachment of an oxidized film on the anode and/or the attachment of scale on the surface of the cathode. This deactivation process deteriorates the electrolytic efficiency of the cell. For example, as this deactivation occurs, the current density can, in some instances, decrease for a constant applied voltage, thereby reducing the rate of electro-oxidation. Alternatively, the current density sometimes can be sustained by increasing the applied voltage. In either instance, energy is wasted and the overall efficiency of the cell is diminished.

From an operational perspective, regeneration of the electrodes by reversing the applied voltage for a period of time can be useful. The reversed voltage may be the same or different as the operating voltage. The reversal voltage may range from about 0.5 volts to about 2.0 volts. Another suitable reversal voltage may range from about 1.4 volts to about 1.6 volts.

During regeneration, the period of time for applying a reversed voltage may vary from just a few minutes to tens of hours. For example, the first and second conducting components may both include one or more metals active toward electrochemical oxidation of urea, therefore either electrode may function as a cathode and produce hydrogen. As such, reversing the voltage is effectively an uninterrupted process, thereby allowing the reversed voltage to be applied for an indefinite period of time or until deactivation is again encountered. According to the operating conditions of the electrochemical cell described herein, electrodes may be operated for about 5 hours to about 20 hours before losing activity and requiring activation.

Conversely, if the anode's conducting component is comprised of a metal inactive toward electrochemical oxidation of urea, the regeneration may be achieved in about 1 minute to about 20 minutes at about 1.4 volts. In some instances, reactivation can be achieved in about 6 minutes at 1.4 volts.

For SCR applications, the SCR unit is not particularly limited to any specific configuration or catalyst. For example, plate, honeycomb, pellet, bead, fiber or corrugated configurations are suitable for use. Moreover, the catalyst is not limited to any species or form. For example, traditional catalysts based on vanadium, titanium, or iron or copper-promoted zeolite catalysts are suitable for use. Additionally, newer SCR catalysts, such as those disclosed in U.S. Pat. No. 7,527,776 by Golden et al. may be used. Similarly, for SNCR applications and/or gas flue conditioning applications, the SNCR unit and/or the particle precipitator are not particularly limited to any specific design.

Accordingly, the electrolytic cells according to embodiments of the present invention may be adapted to couple with commercially available SCR or SNCR units or flue gas conditioning systems. For example, the electrolytic cell may be adapted to work with existing ammonia generators that thermally hydrolyze urea, or the electrolytic cell may be designed to be the lone source of ammonia for the exhaust gas treatment systems. Alternatively, the cell and the exhaust gas treatment system, such as an SCR or an SNCR system, may be designed as a combined unit.

The ammonia may normally be introduced into the exhaust gas prior to an electrostatic precipitator, an SNCR unit, or prior to contacting a catalyst within an SCR unit. The exhaust gas and the ammonia as a reducing agent may be contacted with the catalyst, thereby reducing the nitrogen oxides in the exhaust gas. The optimization of temperatures, pressures, flow rates and the like can readily be achieved by one having ordinary skill in the art of exhaust gas treatment technology.

As used herein and in the appended claims, the singular forms "a", "an", and "the" include plural reference unless the context clearly dictates otherwise. As well, the terms "a" (or "an"), "one or more" and "at least one" can be used interchangeably herein. It is also to be noted that the terms "comprising", "including", "characterized by" and "having" can be used interchangeably.

While the present invention has been illustrated by the description of one or more embodiments thereof, and while the embodiments have been described in considerable detail, they are not intended to restrict or in any way limit the scope of the appended claims to such detail. The various features of exemplary embodiments described herein may be used in any combination. Additional advantages and modifications will readily appear to those skilled in the art. The invention in its broader aspects is therefore not limited to the specific details, representative product and method and illustrative examples shown and described. Accordingly, departures may be made from such details without departing from the scope of the general inventive concept.

What is claimed:

1. A method for supplying $NH_3$ to an exhaust gas treatment system comprising:
   supplying urea to an electrolytic flow cell comprising
      an inlet,
      an outlet,
      a cathode having a first conducting component,
      an anode having a second conducting component, and
      an alkaline electrolyte composition in electrical communication with the anode and the cathode, where the alkaline electrolyte composition has a hydroxide concentration of at least 0.01 M or a pH of at least 8;
   producing ammonia by the electrolytic hydrolysis of urea by applying a voltage difference to the electrolytic flow cell, wherein the voltage difference is applied across the cathode and the anode, wherein the voltage difference is sufficient to effect the electrolytic hydrolysis of urea to produce at least $NH_3$;
   recovering at least a portion of the $NH_3$;
   transferring the at least a portion of the $NH_3$ to the exhaust gas treatment system; and
   recirculating at least a portion of the alkaline electrolyte composition.

2. The method of claim 1, wherein the first conducting component comprises carbon, cobalt, copper, iridium, iron, nickel, palladium, platinum, rhodium, ruthenium, or mixtures or alloys thereof.

3. The method of claim 1, wherein the second conducting component comprises cobalt, copper, iridium, iron, platinum, nickel, rhodium, ruthenium, or mixtures or alloys thereof.

4. The method of claim 1, wherein the second conducting component comprises an oxidized form of cobalt, copper, iridium, iron, platinum, nickel, rhodium, ruthenium, or mixtures or alloys thereof.

5. The method of claim 1, further comprising:
varying at least one of
a temperature of the electrolytic flow cell,
a pressure of the electrolytic flow cell,
an electrical current applied to the electrolytic flow cell, or
a voltage applied to the electrolytic flow cell;
varying a voltage applied to a portion of the anode, wherein the anode comprises an anodic catalyst bed; or
varying an area percentage of a total area of the anodic catalyst bed contacting a urea solution.

6. The method of claim 1, wherein the alkaline electrolyte composition comprises an alkali metal or alkaline earth metal salt of a hydroxide, a carbonate, a bicarbonate, or combinations thereof.

7. The method of claim 1, further comprising heating the electrolytic flow cell.

8. The method of claim 1, wherein the urea is provided as a solid in a cartridge.

9. The method of claim 1, wherein supplying urea to the electrolytic flow cell comprises
diluting a concentrated stock solution of urea with at least a portion of the alkaline electrolyte composition, or
dissolving at least a portion of solid urea with water or at least a portion of the alkaline electrolyte composition.

10. The method of claim 1, further comprising concentrating the alkaline electrolyte composition by evaporating water therefrom.

11. An exhaust gas treatment system for a combustion engine comprising:
at least one of a selective catalytic reduction system, a selective non-catalytic reduction system, or a flue gas conditioning system; and
an ammonia generator comprising an electrolytic flow cell having
an inlet,
at least one outlet,
a cathode having a first conducting component,
an anode having a second conducting component,
an alkaline electrolyte composition in electrical communication with the anode and the cathode, where the alkaline electrolyte composition has a hydroxide concentration of at least 0.01 M or a pH of at least 8, and
a recirculation system operatively coupled to the inlet and the at least one outlet of the electrolytic cell,
wherein the at least one outlet from the ammonia generator is further in communication with the at least one of the selective catalytic reduction system, the selective non-catalytic reduction system, or the flue gas conditioning system.

12. The exhaust gas treatment system of claim 11, wherein the first conducting component comprises carbon, cobalt, copper, iridium, iron, nickel, palladium, platinum, rhodium, ruthenium, or mixtures or alloys thereof.

13. The exhaust gas treatment system of claim 11, wherein the second conducting component comprises cobalt, copper, iridium, iron, platinum, nickel, rhodium, ruthenium, or mixtures or alloys thereof.

14. The exhaust gas treatment system of claim 11, wherein the second conducting component comprises an oxidized form of cobalt, copper, iridium, iron, platinum, nickel, rhodium, ruthenium, or mixtures or alloys thereof.

15. The exhaust gas treatment system of claim 11, wherein the alkaline electrolyte composition comprises an alkali metal or alkaline earth metal salt of a hydroxide, a carbonate, a bicarbonate, or combinations thereof.

16. The exhaust gas treatment system of claim 11, wherein the electrolytic cell further comprises
a heater apparatus operatively coupled to the electrolytic cell.

17. The exhaust gas treatment system of claim 11, wherein the electrolytic cell further comprises a cartridge containing solid urea.

18. The exhaust gas treatment system of claim 11, wherein the recirculation system further comprises an evaporator.

19. An ammonia generator comprising an electrolytic flow cell having
an inlet,
at least one outlet,
a cathode having a first conducting component,
an anode having a second conducting component,
an alkaline electrolyte composition in electrical communication with the anode and the cathode, where the alkaline electrolyte composition has a hydroxide concentration of at least 0.01 M or a pH of at least 8, and
a recirculation system operatively coupled to the inlet and the at least one outlet of the electrolytic cell.

20. The ammonia generator of claim 19, wherein the recirculation system further comprises an evaporator.

* * * * *